Nov. 12, 1963     F. BELTING ET AL     3,110,190
BELT DRIVE
Filed June 19, 1961     5 Sheets-Sheet 1
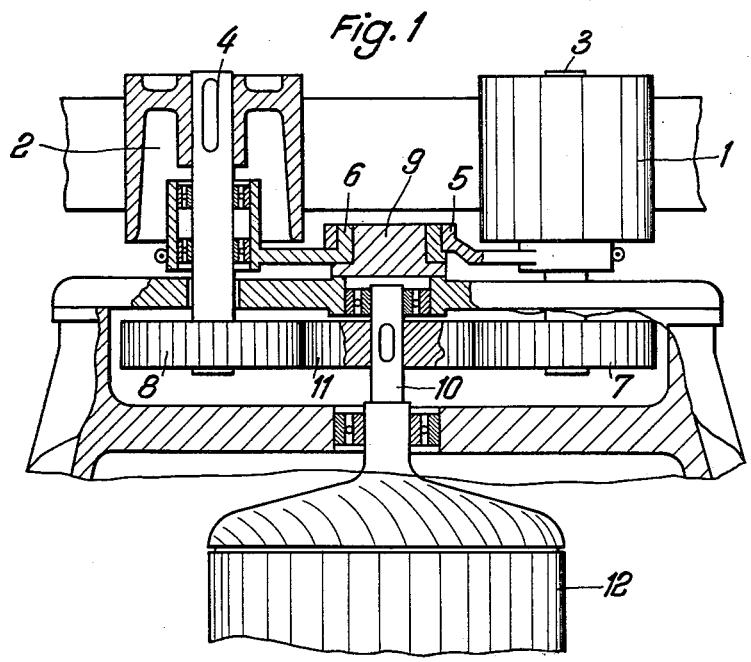
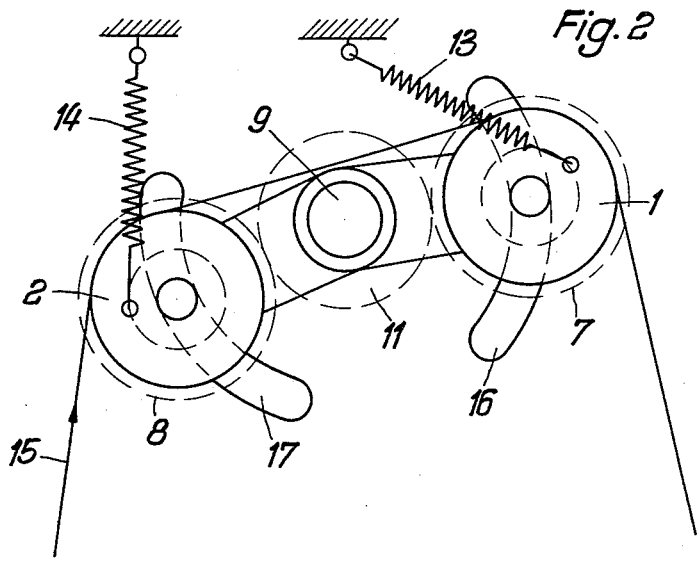
Inventor:
Franz Belting
Albert Kresslein
Ulrich Lossa
By Cushman, Darby & Cushman
attorneys

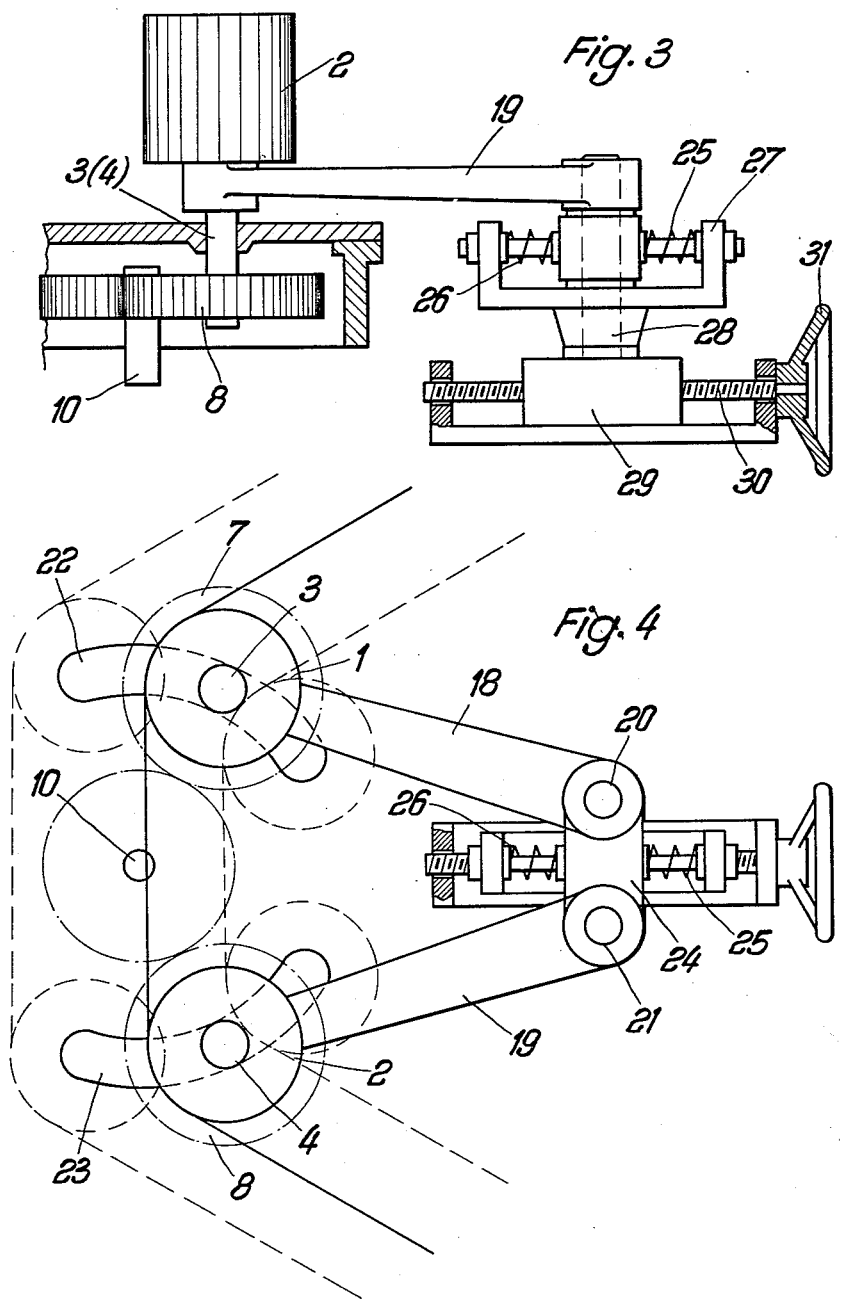

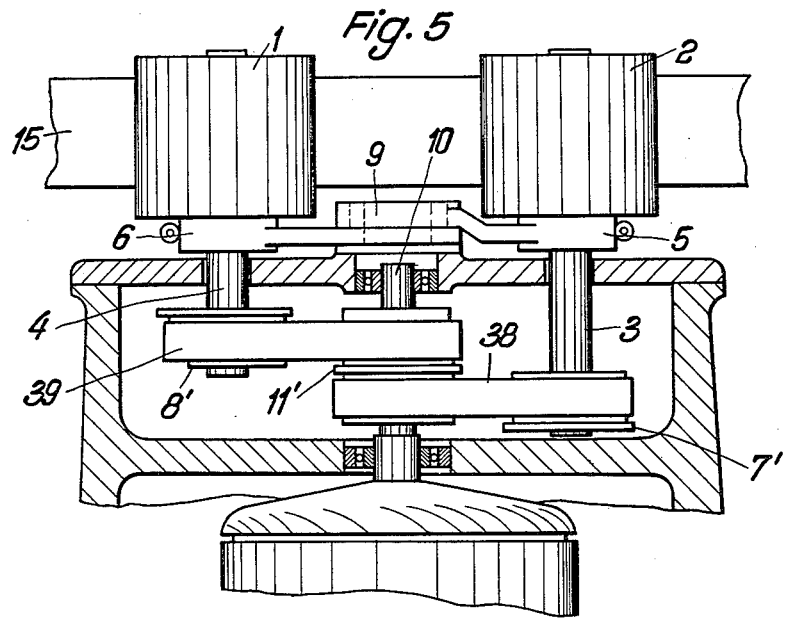
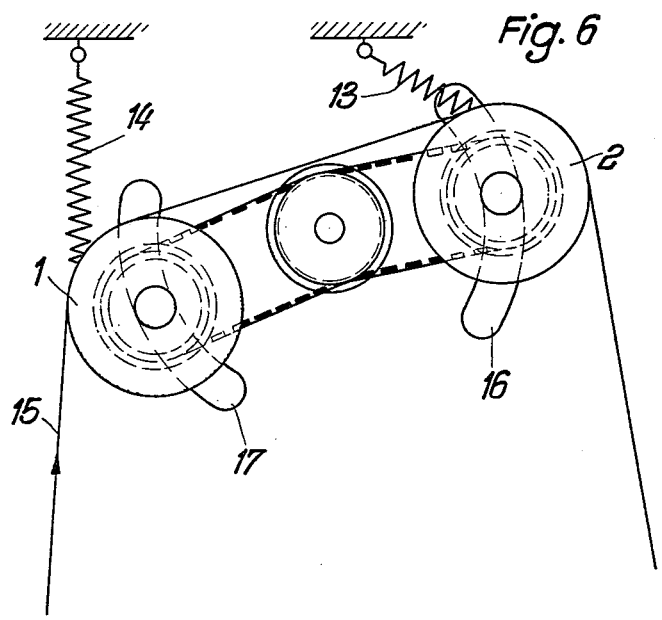

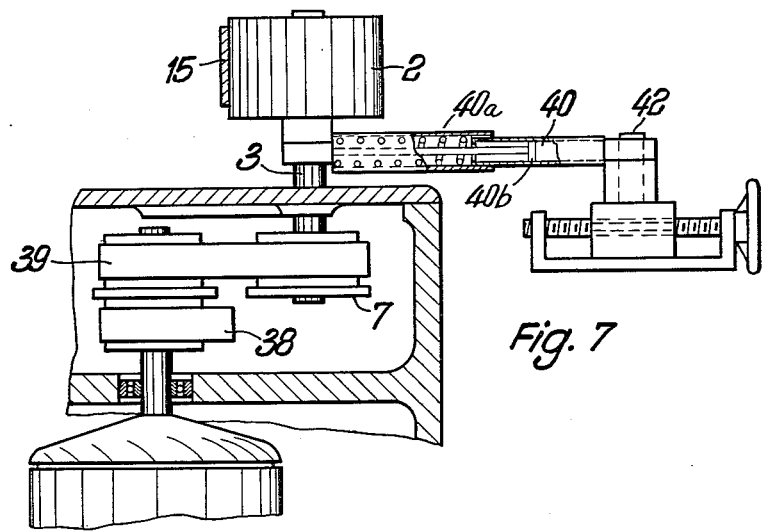
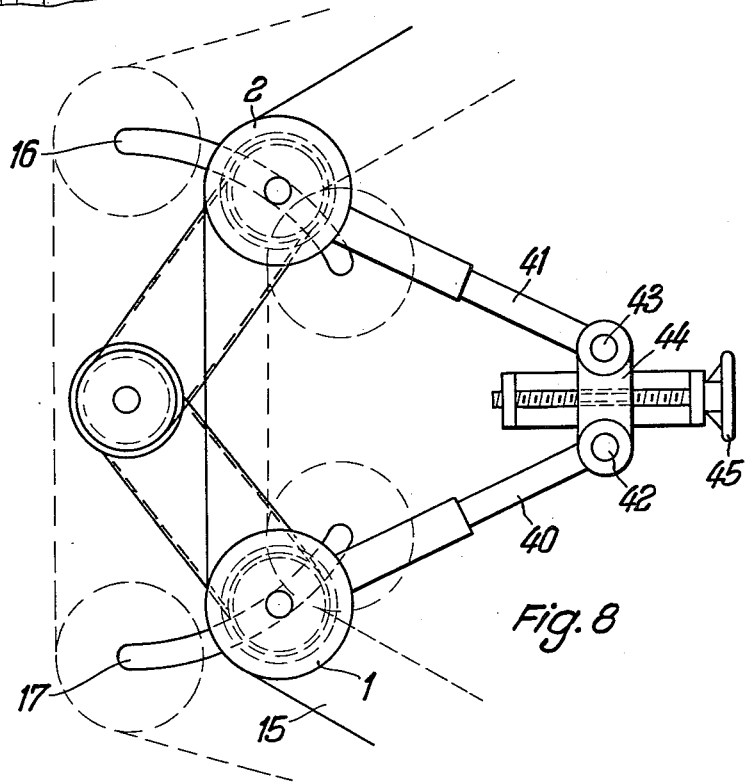

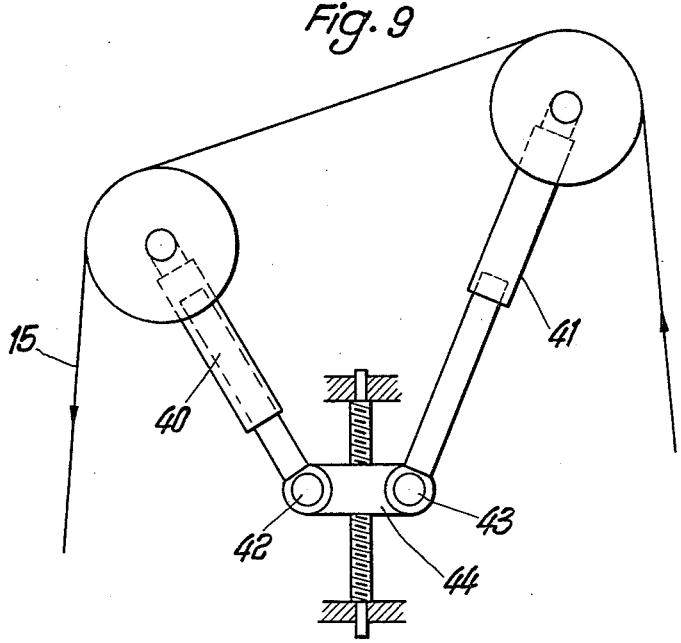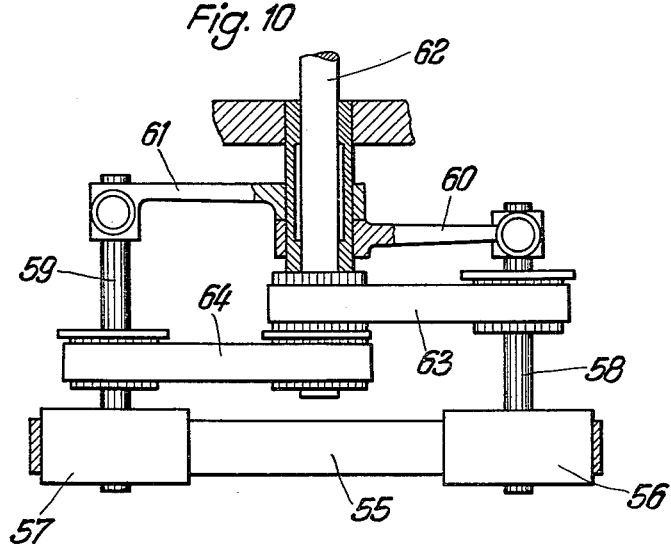

United States Patent Office 3,110,190
Patented Nov. 12, 1963

3,110,190
BELT DRIVE
Franz Belting, Rhede, Kreis Borken, Westphalia, and Albert Kresslein and Ulrich Lossa, Krefeld, Germany, assignors to Volkmann & Company, Krefeld, Germany, a partnership
Filed June 19, 1961, Ser. No. 118,162
Claims priority, application Germany June 22, 1960
6 Claims. (Cl. 74—242.15)

The present invention relates to a belt drive.

A known modification of a normal belt and pulley drive includes two or more driven pulleys. The present invention relates to a belt drive with two driving pulleys.

The object contemplated by the invention is to provide a belt drive in which the belt is not subjected to two-way bending, and which also compensates the different tensions in the tight and slack strands of the belt.

The invention provides a belt drive tensioning device in which two driving pulleys are geared to a common shaft driving or driven by said pulleys and rotatably carried by spring-loaded levers which are independently swingable to give said pulleys movements bodily about the axis of the said shaft.

Thus the two pulleys may each be rigidly connected with a gear wheel, and be independently and swingably deflectable about the axis of the drive shaft which is common to both pulleys, a pinion mounted on said drive shaft meshing with said gear wheels. In this proposal the shafts of the pulleys are borne on spring-loaded lever arms which swing about a centre which is coaxial with the common drive shaft.

Alternatively, the pulley shafts may be guided in slots and mounted on swing arms which are fulcrumed on a holder slidably displaceable in swivelling guide means against the pressure of restoring springs. The swivelling guide means may be adjustably movable by a lead screw and a co-operating nut in a direction perpendicular to the axis of the common drive shaft.

The special advantage inherent in such arrangements is that the tensioning pulley which otherwise is generally provided on the slack side of the belt can be dispensed with, reverse bending of the belt being thus avoided. Also, the advantage is secured that the tension in the belt is self-adjusting according to the existing load.

Incidentally, it is immaterial whether the drive shaft is vertical or horizontal.

It has been found that in certain circumstances the replacement of the gear wheels which are connected with the pulleys and of the pinion on the drive shaft which meshes with the gear wheels by at least one belt transmission may be advantageous. In such a case the provision of a toothed belt is especially useful.

Primarily, the advantage of such a belt transmission resides in that the need for greasing and lubrication is substantially eliminated. The drive may be open and it may be robust in construction.

As has been explained the shafts of the pulley may be guided in slots. In such a case the pulleys may be borne by swing arms fulcrumed on pivots on a holder which is slidably displaceable in a guide means against the pressure of restoring springs. In such an arrangement the two swing arms are bound to be displaced together. However, in another useful arrangement the bearings of the pulleys are adapted independently to adjust themselves to the different tensions in the tight and slack strands of the belt. To this end the invention proposes to embody the swing arms in telescopic spring struts. Gear wheels or belts may be used for transmitting the drive when telescopic struts are thus employed.

The belt drive hitherto described is based on the assumption that the belt, in the form for instance of an endless belt, transmits the drive to, say, the spindles of a textile machine. Nevertheless the proposed arrangement can also be used if the belt transmits the drive to pulleys disposed like planet wheels for transmitting torque to a sun wheel which engages both pulleys. The sun wheel shaft may drive a gearing or the like, for instance the change motion of a yarn twisting frame.

In the invention the belt is self-tensioning and the same tension is maintained in the "pulling" and "pushing" strands of the belt. Consequently the belt drive proposed by the invention is eminently suitable for tangential drives of twist or spinning spindles. All the spindles are driven at a uniform and steady speed and flexing strains in the belt are a minimum, there being no two-way bending because the usual tensioning pulley is absent. The envelopment angle over the two pulleys is large and the specific belt strain is correspondingly low.

Preferred embodiments of the invention are illustratively shown in the appended drawings in which FIG. 1 is a part sectional view and
FIG. 2 a schematic plan view of one embodiment;
FIG. 3 is a side view and
FIG. 4 a plan view of an alternative embodiment;
FIG. 5 is a part sectional view of another embodiment and
FIG. 6 a schematic plan view of FIG. 5;
FIG. 7 is a side view of yet another embodiment and
FIG. 8 a plan view of FIG. 7;
FIG. 9 is a schematic representation of the manner in which the mechanism according to FIGS. 7 and 8 functions, and
FIG. 10 is a view of an embodiment in which the direction of power flow is reversed.

In FIGS. 1 to 4 the two pulleys are indicated by 1 and 2. The shafts 3 and 4 run in bearings at the end of swing arms 5 and 6. The bottom ends of the two shafts 3 and 4 each carry a gear wheel 7 and 8.

The swing arms 5 and 6 are fulcrumed on a bearing member 9 which is disposed in axial alignment with a drive shaft 10. The drive shaft 10 carries a pinion 11 which meshes with both gear wheels 8 and 7. In this embodiment shaft 10 is the rotor shaft of an electric motor 12. However, the motor might be located above and not as shown in FIGS. 1 and 2 below the pulleys. Alternatively the motor could be located on one side and arranged to drive the vertical shaft by bevel wheels.

FIG. 2 is a diagrammatic drawing illustrating the manner in which this scheme functions. The swing arms 5 and 6 are loaded by tension springs 13 and 14 as well as by the driven belt 15. In a modification of this arrangement compression springs could take the place of the tension springs. Under the influence of these loads the arms 5 and 6 and the pulleys 1 and 2 swing to and fro in slots 16 and 17 until equilibrium is reached and the forces in the existing circumstances balance. For placing the belt over the pulleys the springs 13 and 14 are somewhat slackened.

In the embodiment shown in FIGS. 3 and 4, the pulleys 1 and 2 and their shafts 3 and 4 are mounted on arms 18 and 19 which are fulcrumed at 20 and 21 respectively. The swinging motion of the shafts 3 and 4 are prescribed by the slots 22 and 23 which constrain the gear wheels 7 and 8 to swing about the axis of their common drive shaft 10.

The fulcra 20/21 are located on a holder 24 which is slidably displaceable in a guide 27 against the resistance of restoring springs 25 and 26. This guide 27 is itself rotatable about a pin 28 and adjustable in a direction perpendicular to the axis of the common drive shaft 10. To this end pivot 28 is mounted on a nut 29 which is movable by a lead screw 30 operated by handwheel 31.

In the embodiment shown in FIG. 5 the pulleys 1 and 2 and their shafts 3 and 4 are likewise mounted on swing arms 5 and 6. However, the bottom ends of shafts 3 and 4 each carry a further pulley 7' and 8' respectively which take the place of the gear wheels 7 and 8 in FIG. 1.

The swing arms 5 and 6 pivot on a bearing member 9 which is located in axial alignment with the drive shaft 10. The drive shaft 10 in this arrangement carries a double pulley 11' which drives the two pulleys 7' and 8' through corresponding belts 38 and 39 respectively. In the illustrated embodiment these belts are toothed, a form of construction which has been found to suit this purpose well.

FIG. 6 shows the general scheme upon which this embodiment is based. The swing arms 5 and 6 are loaded by the tension springs 13 and 14 as well as by the driven belt. A slight modification of the arrangement would permit compression springs to replace the tension springs. Under these loads the arms 5 and 6 and hence the pulleys 1 and 2 swing to and fro along the slots 16 and 17 until equilibrium has been reached and the forces in the existing operational conditions balance.

The arrangement shown in FIG. 7 corresponds with that illustrated in FIG. 3, excepting that the swing arms 5 and 6 are replaced by swinging spring-loaded telescopic struts 40 and 41. The telescopic struts 40 and 41 are fulcrumed at 42 and 43 on a travelling nut 44 which can be operated by a handwheel 45 for adjusting the tension of the belt. In this arrangement shafts 3 and 4 are guided in slots 16 and 17. Pivotal support of the holder is not necessary although it could be provided.

The manner in which this scheme functions will be understood from FIG. 9. When belt 15 runs in the direction indicated by the arrows, the pulling strand of the belt submits the telescopic strut marked 40 to considerable compression, the strut yielding accordingly and shortening. On the other hand, strut 41 which supports the pushing strand of the belt extends. This action of the struts compensates the elongations in the strands. In given circumstances shock absorbing means may be usefully incorporated in the struts in the manner of hydraulic suspension units. In FIG. 7, the loading spring is marked 40a and the finely apertured piston 40b controls flow from side to side thereof to give the required retardation by the oil in the strut.

The employment of telescopic struts 40 and 41 does not require that the transmission of the torque should be by belts 38 and 39. Gear wheels and pinions, as in FIG. 1, would work as well.

Whereas in the embodiments shown in FIGS. 1 to 9 it is the belt 15 which is driven by the pulleys 1 and 2, the direction of power flow could naturally be reversed. An arrangement of this latter kind is shown in FIG. 10. Belt 55 drives the pulleys 56 and 57 which are mounted on shafts 58 and 59. The latter are supported on swing arms 60 and 61 both fulcrumed in a bearing member which is coaxial with shaft 62. Shaft 62 is driven by the pulleys through belts 63 and 64.

What we claim is:

1. A belt drive tensioning device comprising two driving pulleys, a gear wheel rigidly connected with each said pulley, a drive shaft common to the said pulleys, a pinion on said shaft engaging said gear wheels, the pulleys being rotatably carried by independently swingable spring-loaded arms which are supported for swinging about the axis of the said shaft to give said pulleys movements bodily about the said axis.

2. Belt drive tensioning device comprising two driving pulleys, a common drive shaft, drive means between said pulleys and said shaft, independently swingable arms, a holder therefor to which said arms are separately pivoted, said pulleys being rotatably carried by the said arms, a guide means for said holder, said holder being disposed for sliding movement with respect to said guide means against the pressure of spring-restoring means, means supporting said guide means to allow swivelling thereof, and arcuate means for guiding said pulleys in movement bodily about the axis of said shaft.

3. Belt drive tensioning device according to claim 2 comprising lead screw means for adjustably moving said guide means in a direction perpendicular to the axis of the common drive shaft.

4. A belt drive tensioning device comprising two driving pulleys, drive means between the said pulleys and a common drive shaft, said pulleys being rotatably carried by independently swingable spring-loaded telescopic arms which are pivoted to a common member, and means for guiding said pulleys in movement bodily about the axis of said shaft.

5. A belt drive tensioning device comprising two driving pulleys and a common shaft, means gearing the said pulleys to the said common shaft and spring-loaded telescopic arms, said pulleys being rotatably carried by the said telescopic arms and the said arms being independently swingable to give said pulleys movement bodily about the axis of the said shaft.

6. A belt drive tensioning device comprising two driving pulleys and a common shaft, means gearing the said pulleys to the said common shaft, spring-loaded arms, said pulleys being rotatably carried by the said arms and the said arms being independently swingable, and arcuate means for guiding the said pulleys for angular displacement about the axis of said common shaft.

References Cited in the file of this patent

UNITED STATES PATENTS

| | | |
|---|---|---|
| 489,292 | Duffy | Jan. 3, 1893 |
| 1,402,891 | Reiland et al. | Jan. 10, 1922 |
| 1,823,696 | Morse | Sept. 15, 1931 |
| 2,494,117 | Dickieson | Jan. 10, 1950 |

FOREIGN PATENTS

| | | |
|---|---|---|
| 1,004,343 | France | Nov. 28, 1951 |
| 1,198,252 | France | June 8, 1959 |